United States Patent
Williams

(10) Patent No.: US 11,746,730 B1
(45) Date of Patent: Sep. 5, 2023

(54) HYDROGEN OXYGEN GENERATOR FOR VEHICLES

(71) Applicant: Floyd E. Williams, Grand Junction, CO (US)

(72) Inventor: Floyd E. Williams, Grand Junction, CO (US)

( * ) Notice: Subject to any disclaimer, the term of this patent is extended or adjusted under 35 U.S.C. 154(b) by 0 days.

(21) Appl. No.: 17/859,401

(22) Filed: Jul. 7, 2022

Related U.S. Application Data

(63) Continuation-in-part of application No. 17/562,636, filed on Dec. 27, 2021, now Pat. No. 11,512,671.

(51) Int. Cl.
*F02M 25/028* (2006.01)
*F02M 25/12* (2006.01)
*F02M 35/10* (2006.01)

(52) U.S. Cl.
CPC ...... *F02M 25/12* (2013.01); *F02M 35/10209* (2013.01)

(58) Field of Classification Search
CPC .... F02B 47/02; F02B 2043/106; F02B 63/04; F02M 21/0206; F02M 21/0203; F02M 63/0007; F02M 25/025; F02M 25/028; F02M 25/03; F02M 25/0228; F02M 25/0221; F02M 25/0222; F02M 25/0224
See application file for complete search history.

(56) References Cited

U.S. PATENT DOCUMENTS 6,756,140 B1 * 6/2004 McAlister .......... F02M 63/0007
429/422

* cited by examiner

*Primary Examiner* — George C Jin
*Assistant Examiner* — Teuta B Holbrook
(74) *Attorney, Agent, or Firm* — Edwin H. Crabtree; Ramon L. Pizarro

(57) ABSTRACT

An improved hydrogen oxygen generator used for converting water to hydrogen gas and oxygen gas, which is mixed with fuel in a vehicle engine for improved mileage and cleaner burning fuel. The generator includes a water bottle. Water from the water bottle is fed by gravity through a water line, with an inline water line orifice adapter. The water line is connected to a threaded water line nipple. The water line nipple is attached to a solenoid valve. The solenoid valve is used for heating the water, in a range of 100 to 150 degrees F., and is connected to a wireless signal receiver, for receiving a remote signal for turning the generator "on" and "off". A gas generator nipple is attached to the solenoid valve and to a side of an engine manifold. The generator nipple is used for creating hydrogen gas and oxygen gas from the heater water and then introducing the heated hydrogen and oxygen gas with engine fuel inside the manifold.

15 Claims, 3 Drawing Sheets

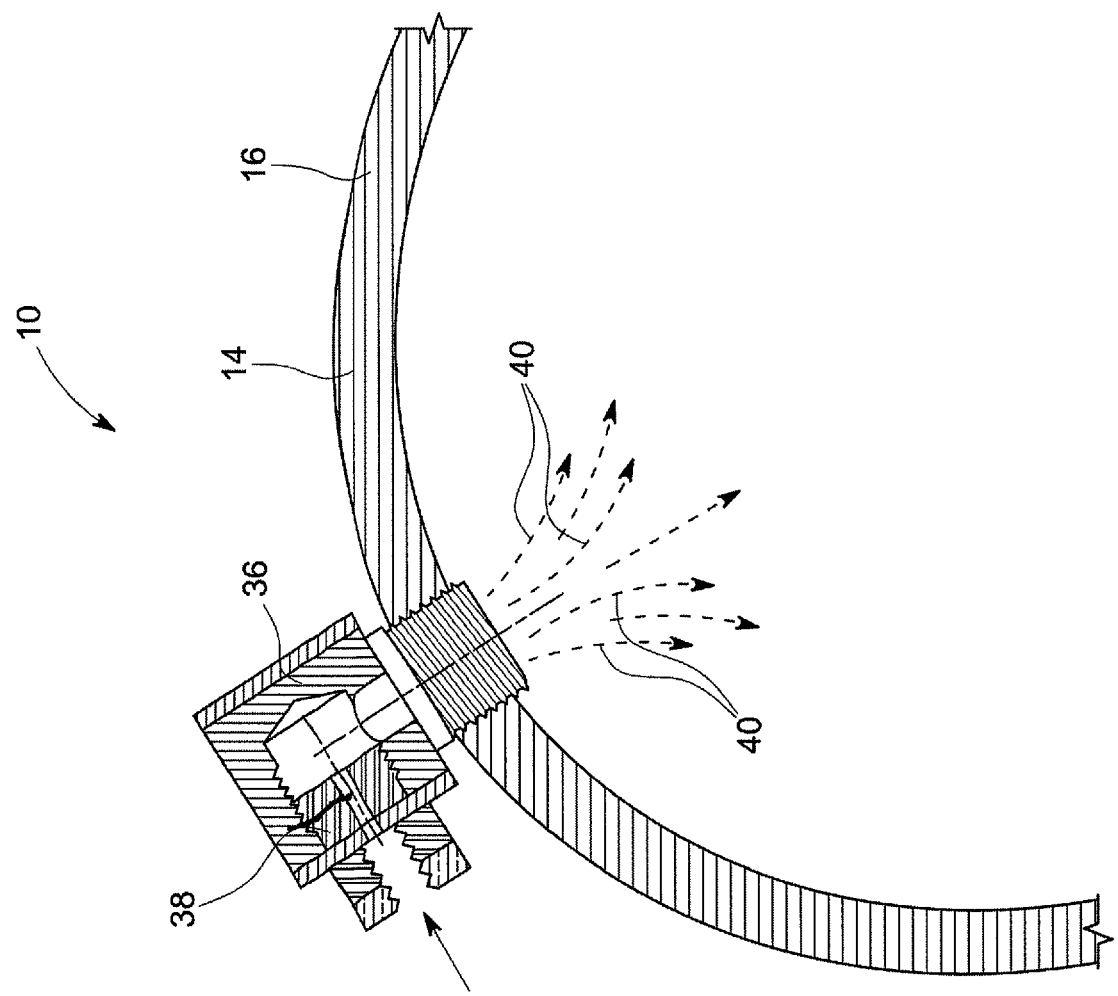

US 11,746,730 B1

HYDROGEN OXYGEN GENERATOR FOR VEHICLES

This patent application is a Continuation-In-Part (CIP) of a utility patent application, filed on Dec. 27, 2021, Ser. No. 17/562,636, by the subject inventor, and having a title of "HYDROGEN OXYGEN GENERATOR FOR VEHICLES"

BACKGROUND OF THE INVENTION

(a) Field of the Invention

This invention relates to a substantial improvement related to a hydrogen oxygen generator and more particularly, but not by way of limitation, to a hydrogen oxygen generator for converting water to hydrogen gas and oxygen gas. The two gases are introduced into a vehicle engine manifold for mixing with engine fuel in the engine. The generator can be used with both diesel and gasoline engines.

(b) Discussion of Prior Art

Heretofore, there have been many different designs of engine carburetors for improved gas and diesel engine combustion. None of these prior art carburetors provide for creating hydrogen and oxygen from water for more efficient engine performance.

SUMMARY OF THE INVENTION

In view of the foregoing, it is a primary objective of the subject hydrogen oxygen generator is to convert water to hydrogen gas and oxygen gas for mixing with engine fuel.

Another object of the invention is by creating hydrogen and oxygen mixed with engine fuel, mileage of the vehicle is increased in a range of 10 to 20 percent. Typically, the generator uses 1 oz of water for every 25 miles of travel.

Yet another object of the invention is the hydrogen oxygen generator provides for cleaning burning fuel, a cleaner engine, and improved engine maintenance.

The improved hydrogen oxygen generator includes a water bottle, with a water bottle cap, for holding distilled water. Water from the water bottle is fed by gravity through a water line. The water line includes an inline, water line, orifice adapter, with small orifice, for regulating water flow through the water line. The water line is connected to a threaded water line nipple. The water line nipple is attached to a 12 volt electric solenoid valve. The solenoid valve is used for heating the water, in a range of 100 to 150 degrees F. Also, the solenoid valve is connected to a wireless signal receiver, for receiving a remote signal for turning the generator "on" and "off" from inside the vehicle. An "L" shaped gas generator nipple is attached to the solenoid valve and to a side of an engine manifold. The generator nipple, having a small orifice, is used for creating hydrogen and oxygen from the heated water and then introducing the heated hydrogen and oxygen with engine fuel inside an engine manifold.

These and other objects of the present invention will become apparent to those familiar with various types of vehicle engines and fuel carburetors when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes devised for the practical application of the subject improved hydrogen oxygen generator, and in which:

FIG. 1A is a cross sectional view of a gas generator nipple attached the engine manifold.

DETAILED DESCRIPTION OF THE PREFERRED EMBODIMENTS

Figure 1:
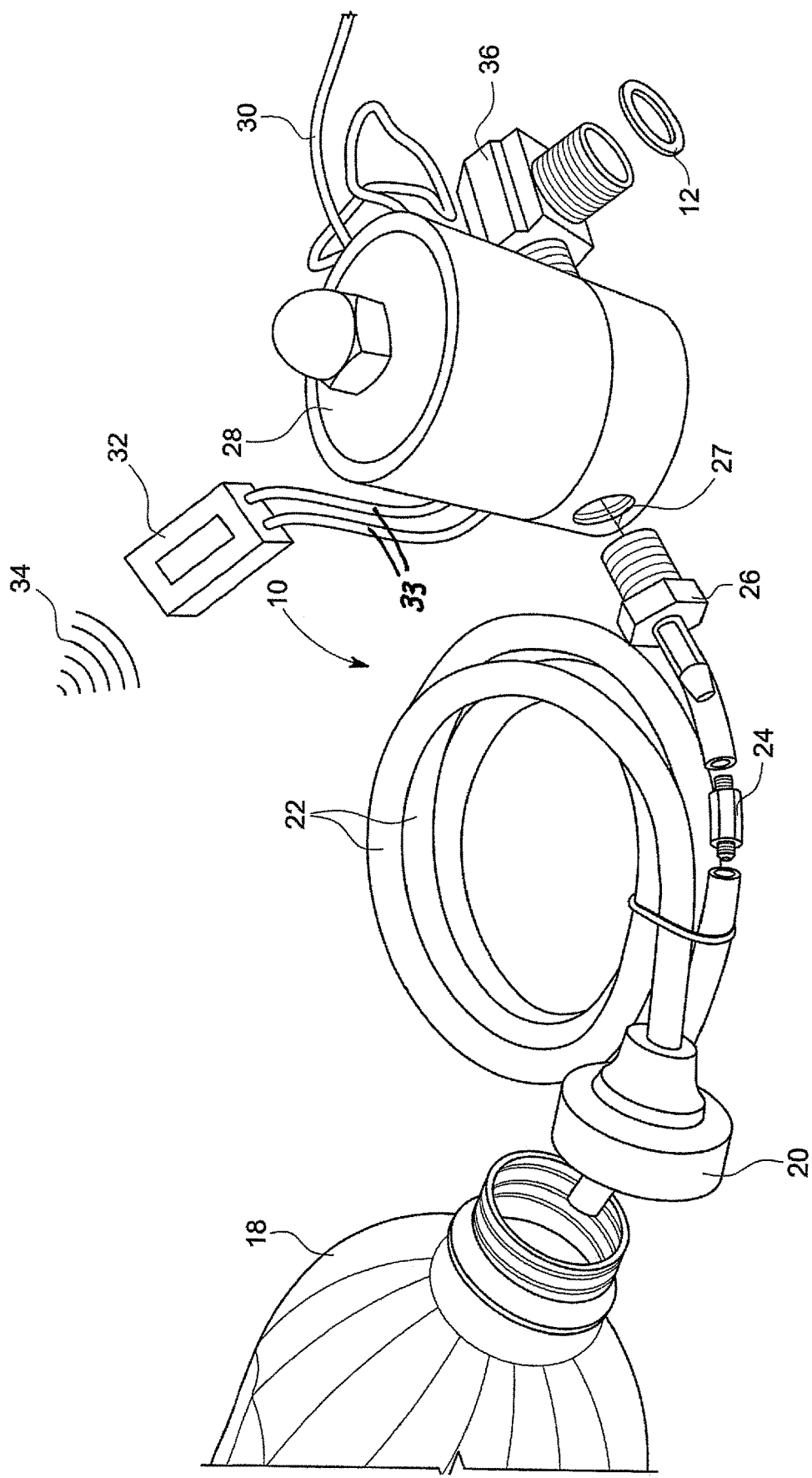
FIG. 1 is a perspective view of the hydrogen oxygen generator with the various components making up the generator for attachment to an engine manifold.
Figure 2:
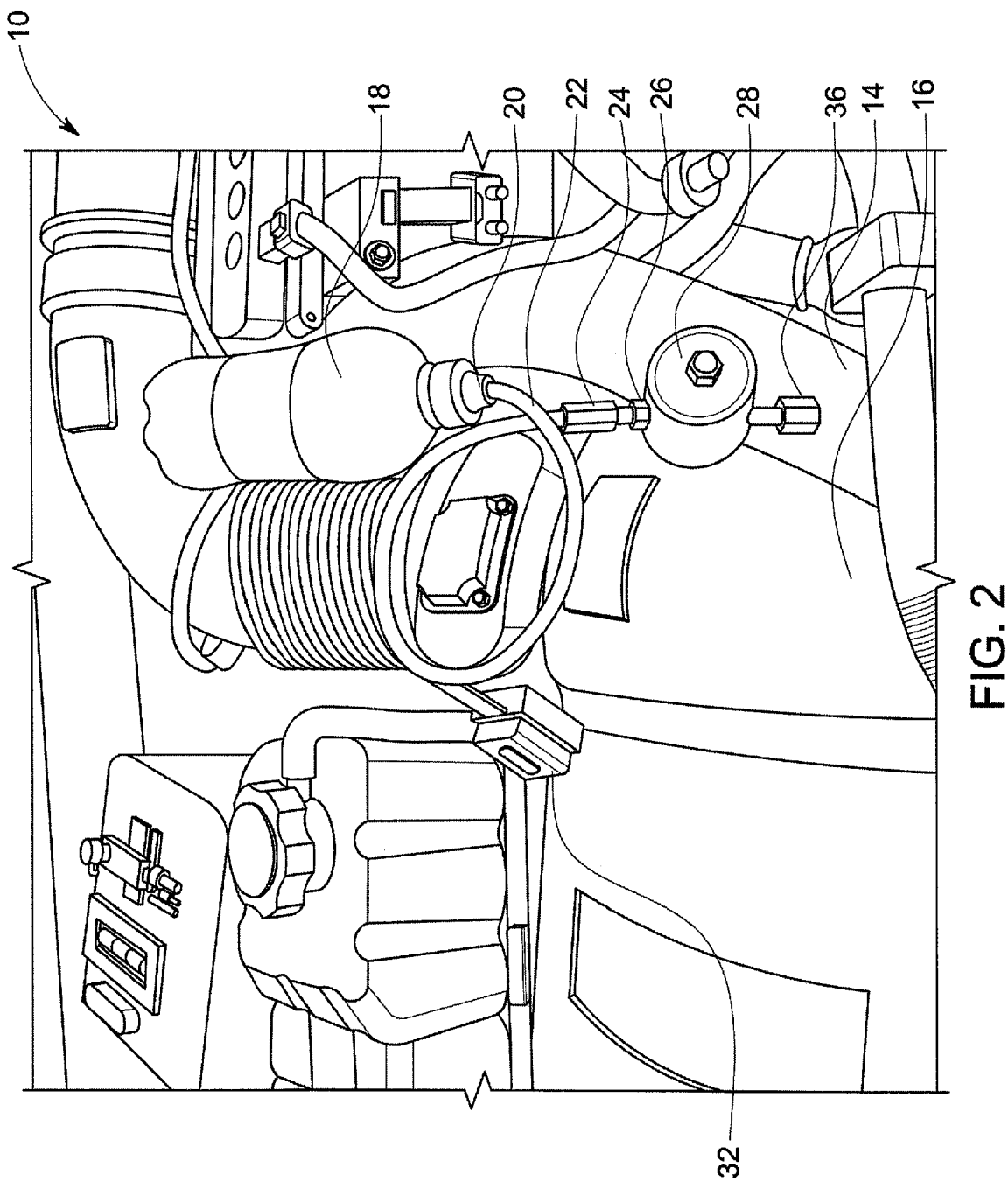
FIG. 2 is another perspective view of the improved hydrogen oxygen generator attached to the engine manifold and disposed next to an engine radiator.

In FIG. 1, the subject hydrogen oxygen generator is shown having a general reference numeral 10. The generator 10, with a rubber grommet 12, is attached to a side of an engine air duct manifold 14, as shown in FIG. 1A and FIG. 2. The manifold 14 is part of a vehicle engine 16.

In this drawing, the generator 10 is made up of a water bottle or container 18, with water bottle cap 20. The container 10 typically holds 10 to 12 ounces of distilled water or more for a 20 gallon vehicle fuel tank. The water bottle 18 is connected to one end of a water line 22. The water line is typically ¼ inch in diameter. The water line 22 includes a water line orifice adapter 24 for adjusting the amount of water flowing through the water line. The orifice adapter 24 has an inline orifice in a range of 0.005 to 0.015 inches in size and more specifically 0.010 inches in size. An opposite end of the water line 22 is connected to a water line nipple 26. The water line nipple 26 is attached, as shown by dashed lines 27, to one side of a 12 volt electric solenoid valve 28.

The solenoid valve 28 is used for heating the water from the water line 22, in a range of 100 to 150 degrees F. Also, the valve 28 is connected to a vehicle battery, not shown in the drawings, via electric leads 30. Further, the valve 28 is connected to a remote, wireless signal receiver 32, via electric leads 33. The signal receiver 32 is used for receiving a remote signal 34 and turning the solenoid valve 28 "on" and "off".

An "L" shaped gas generator nipple 36 is attached to an opposite side of the valve 28 and attached to the engine manifold 14, as shown in FIG. 1A.

In FIG. 1A, a cross sectional view of the gas generator nipple 36 is shown attached the engine manifold 14. The flow of the gas generator nipple 36 is controlled by a small inline orifice 38. The small orifice 38 is important in it creates a venturi effect for turning the water into hydrogen gas and oxygen gas, shown as arrows 40, as it passes through the nipple 36 into the manifold 14. The water is drawn into the nipple 36 by a vacuum from the manifold 14.

In FIG. 2, another perspective view of the improved hydrogen oxygen generator 10 is shown attached to the engine manifold and disposed next to an engine radiator. In this drawing, the water bottle 18 is mounted on top of an vehicle engine compartment for feeding, by gravity, water through the water line 22. The water is received through the water line orifice adapter 24, through the water line nipple 36, and into the solenoid valve 28, where the water is heated.

The heated water is then drawn, by a vacuum from the engine manifold 14, through the gas generator nipple 36 and converted into hydrogen and oxygen gas 40. The gas is then mixed with engine fuel inside the manifold 14.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiment of the invention for which as exclusive privilege and property right are claimed and defined as follows:

1. An improved hydrogen oxygen generator used for converting water to hydrogen and oxygen, which is mixed with fuel to a vehicle engine for improved mileage and cleaner burning fuel, the generator comprising:
   a water bottle for holding distilled water;
   a water line connected to the water bottle;
   a water line orifice adapter, connected to the water line, for adjusting the amount of water flowing through the water line;
   a water line nipple connected to the water line;
   a solenoid valve connected to the water line nipple, the solenoid valve used for heating the water; and
   a gas generator nipple attached to the solenoid valve, the gas generator nipple adapted for connecting to a side of an engine manifold, the generator nipple used for creating hydrogen gas and oxygen gas from the heater water and then introducing the heated hydrogen gas and oxygen gas with engine fuel inside the manifold.

2. The generator as described in claim 1 wherein the water line orifice adapter has an inline orifice in a range of 0.005 to 0.0015 inches in size.

3. The generator as described in claim 1 wherein the water line orifice adapter has an inline orifice 0.010 inches in size.

4. The generator as described in claim 1 further including a wireless signal receiver connected to the solenoid valve for receiving a remote signal and turning the solenoid valve "on" and "off".

5. The generator as described in claim 1 wherein the water bottle holds water in a range of 10 to 12 ounces and greater.

6. The generator as described in claim 1 wherein the water line is ¼ inch in diameter.

7. An improved hydrogen oxygen generator used for converting water to hydrogen and oxygen, which is mixed with fuel to a vehicle engine for improved mileage and cleaner burning fuel, the generator comprising:
   a water bottle for holding distilled water;
   a water line connected to the water bottle;
   a water line orifice adapter, connected to the water line, for adjusting the amount of water flowing through the water line;
   a water line nipple connected to the water line;
   a 12 volt electric solenoid valve connected to the water line nipple, the solenoid valve used for heating the water from the water bottle;
   a wireless signal receiver connected to the solenoid valve, the receiver for receiving a remote signal for turning the solenoid valve "on" and "off"; and
   a gas generator nipple attached to the solenoid valve and adapted for connecting to a side of an engine manifold, the generator nipple used for creating hydrogen and oxygen from the heater water and then introducing the heated hydrogen gas and oxygen gas with engine fuel inside the manifold.

8. The generator as described in claim 7 wherein the water line orifice adapter has an inline orifice in a range of 0.005 to 0.0015 inches in size.

9. The generator as described in claim 7 wherein the water line orifice adapter has an inline orifice 0.010 inches in size.

10. The generator as described in claim 7 wherein the water bottle holds water in a range of 10 to 12 ounces and greater.

11. The generator as described in claim 7 wherein the water line is inch in diameter.

12. An improved hydrogen oxygen generator used for converting water to hydrogen and oxygen, which is mixed with fuel to a vehicle engine for improved mileage and cleaner burning fuel, the generator comprising:
   a water bottle for holding distilled water;
   a water line connected to the water bottle;
   a water line orifice adapter, connected to the water line, for adjusting the amount of water flowing through the water line, the water line orifice adapter having an orifice in a range of 0.005 to 0.015 inches in size;
   a water line nipple connected to the water line;
   a solenoid valve connected to the water line nipple, the solenoid valve used for heating the water; and
   a gas generator nipple attached to the solenoid valve and adapted for connecting to a side of an engine manifold, the generator nipple having an inline orifice for creating venturi effect for creating hydrogen gas and oxygen gas from the heater water, the hydrogen gas and oxygen gas then mixed with engine fuel inside the engine manifold.

13. The generator as described in claim 12 further including a wireless signal receiver connected to the solenoid valve for receiving a remote signal and turning the solenoid valve "on" and "off".

14. The generator as described in claim 12 wherein the water bottle holds water in a range of 10 to 12 ounces and greater.

15. The generator as described in claim 12 wherein the water line is ¼ inch in diameter.

\* \* \* \* \*